(12) United States Patent
Wiener

(10) Patent No.: US 7,266,597 B2
(45) Date of Patent: Sep. 4, 2007

(54) METHOD FOR CONFIGURING A SYSTEM MANAGEMENT STATION

(75) Inventor: Peter Wiener, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 654 days.

(21) Appl. No.: 10/128,200

(22) Filed: Apr. 23, 2002

(65) Prior Publication Data

US 2003/0200297 A1 Oct. 23, 2003

(51) Int. Cl.
*G06F 15/173* (2006.01)
(52) U.S. Cl. .................. 709/223; 709/220; 709/227
(58) Field of Classification Search ............... 709/220, 709/223, 227; 370/389, 401, 475
See application file for complete search history.

(56) References Cited

U.S. PATENT DOCUMENTS

| | | | |
|---|---|---|---|
| 6,697,360 B1 * | 2/2004 | Gai et al. | 370/389 |
| 2002/0174209 A1 * | 11/2002 | Sesek et al. | 709/223 |
| 2003/0005100 A1 * | 1/2003 | Barnard et al. | 709/223 |

OTHER PUBLICATIONS

"Network and Distributed Systems Management," Sloman, Ed. (1994) pp. 303-347.
"Dynamic Host Configuration Protocol," Network Working Group, Bucknell University, Mar. 1997 pp. 1-45.
"UPnP™ Device Architecture," Version 1.0, Jun. 8, 2000, Contributing Members of the UPnP Form (1999).
"Preboot Execution Environment (PXE) Specification, Version 2.1", Intel Corp. Sep. 20, 1999—pp. i-iii and 1-38.

* cited by examiner

*Primary Examiner*—Yves Dalencourt
(74) *Attorney, Agent, or Firm*—Schiff Hardin LLP

(57) ABSTRACT

In a method for automatically configuring a System Management Station (SMS) to monitor a recently added computer to a network being monitored by the SMS, a message is received by the SMS. The message contains information about the IP-address, the operating system, and at least one application of the recently added computer. The SMS retrieves the information and registers the recently added computer, so that it will be monitored. After registering the computer, the SMS retrieves at least one relevant event detection criterion from a database and conveys it to the computer. After receiving the event criterion, the computer is automatically configured, so that it detects events according to the event detection criterion.

18 Claims, 11 Drawing Sheets

METHOD FOR CONFIGURING A SYSTEM MANAGEMENT STATION

BACKGROUND OF THE INVENTION

1. Field of the Invention

The invention relates to network management, and specifically, to automatic configuration of a System Management Station and a managed object.

2. Description of the Prior Art

The purpose of monitoring a network is to manage network performance, discover and solve network problems, and plan for network growth. According to Morris Sloman (Editor), "Network and Distributed Systems Management", Addison-Wesley, England, 1994, pg. 303, monitoring can be defined as the process of dynamic collection, interpretation, and presenting of information concerning objects or software processes under scrutiny. Monitoring can be used for general network management, such as performance management, configuration management, fault management, or security management. One important application of monitoring is event reporting which is explained below using definitions taken from the aforementioned text at pp. 303 to 347.

The network to be monitored is comprised of one or more managed objects. A managed object is defined as any hardware or software component whose behavior can be monitored or controlled by a management system. Hardware components may be hubs, routers, computers, bridges, etc. Each managed object is associated with a status and a set of events. The status of a managed object is a measure of its behavior at a discrete point in time. An event is defined as an atomic entity which reflects a change in the status of the managed object. The behavior of the managed object can be defined and observed in terms of its status and events.

The status of the managed object lasts for a certain time period. Examples of a status are "process is idle" or "process is running". An event occurs instantaneously. Examples of an event are "message sent" or "process started". Since the status of an managed object is normally changing continuously, the behavior of the managed object is usually observed in terms of a distinguished subset of events, called events of interest. Events of interest reflect significant changes in the status of the managed object.

In order to monitor the events of interest, events of interest must be detected. An event is said to have occurred when the conditions which are defined by event detection criteria are satisfied. These conditions are detected by appropriate instrumentation, such as software and hardware probes or sensors inserted in the managed object.

Event detection may be internal within or external from the managed object. Internally performed event detection is typically performed as a function of the managed object itself. Externally performed event detection may be carried out by an external agent which receives status reports of the managed object and detects changes in the status of the managed object.

The occurrence of the event may be detected in real-time or delayed. Once the event is detected, an event report is generated at the managed object. The event report may comprise an event identifier, type, priority, time of occurrence, the status of the managed object immediately before and after the occurrence of the event, and other application-specific status variables.

In order to monitor the dynamic behavior of the managed object, the event report may be conveyed from the managed object to a central unit. At the central unit event reports may be gathered, visualized, and recorded. The central unit may be a System Management Station (SMS) on which an appropriate software, usually called a manager, resides. The manager executes management applications that monitor and control the managed objects. Physically, an SMS, sometimes called a console, is usually an engineering workstation with a fast CPU, megapixel color display, substantial memory, and abundant disk space. The SMS may comprise a database on which incoming reports sent by the managed objects, such as event reports, are stored.

Received reports can be viewed with the Graphical User Interface (GUI) of the SMS.

In order to carry out network management, each managed object must not only know its event detection criteria, but the SMS must also know which devices of the network it shall monitors. Specifically, the SMS must know which of the devices are managed objects. If a device is added to the network and this device is to be monitored by the SMS, the device must be configured with its relevant event detection criteria and must be introduced to the SMS, so that the SMS will be able to communicate with it.

Described below is the way to appropriately configure an SMS and a device that has just been connected to a network according to the state of the art.

FIG. 1 depicts a network 100 having several managed objects 2 to 9. Managed objects 2 and 4 are computer controlled x-ray apparatuses, corresponding to a first type of managed object which is referred to as "x-ray apparatus". Managed objects 3 and 5 are computer controlled magnetic resonance apparatuses corresponding to a second type of managed object which is referred to as "MR-apparatus". Managed objects 6 and 7 are computed tomography apparatuses corresponding to a third type of managed object which is referred to as "CT-apparatus". Managed objects 8 and 9 are standard PCs connected to the network 100, corresponding to a fourth type of managed object which is referred to as "PC".

The network 100 is monitored with a System Management Station (SMS) 1 which physically is a computer connected to the network 100 using the agent-manager network management system HP OpenView. On the SMS 1 resides a manager which communicates with agents residing on the managed objects 2 to 9. The manager is software configured to receive reports sent by the agents. An agent is software configured to control and detect significant changes in the status of its corresponding managed object according to a predefined set of event detection criteria. In the present exemplary embodiment, agents of the same type of managed object are configured with essentially the same set of event detection criteria specific to that type of managed object. Therefore the agents of the managed objects 2 and 4, which are of the type "x-ray apparatus", are configured with a set of event detection criteria specific to x-ray apparatuses; the agents of managed objects 3 and 5, which are of the type "MR-apparatus", are configured with a set of event detection criteria specific to magnetic resonance apparatuses; the agents of managed objects 6 and 7, which are of the type "CT-apparatus", are configured with a set of event detection criteria specific to computed tomography apparatuses, and managed objects 8 and 9, which are of the type "PC", are configured with a set of event detection criteria specific to PCs connected to the network 100.

An operator (not shown in the Figures) monitors the network 100 with the SMS 1 by viewing a display of the network 100 on the screen of the SMS 1. The displayed network is depicted in FIG. 2. The managed objects 2 to 9 are represented as icons 22 to 29. Icons 22 and 24 represent the managed objects 2 and 4 (computer controlled x-ray apparatuses); icons 23 and 25 represent the managed objects 3 and 5 (computer controlled magnetic resonance apparatuses); icons 26 and 27 represent the managed objects 6 and 7 (computed tomography apparatuses); icons 28 and 29 represent the managed objects 8 and 9 (PCs).

When a new device is connected to the network 100, for example by a technician (not shown in the Figures), and the device is to be additionally monitored with the SMS 1, then not only must this new device be configured with its relevant set of event detection criteria, but also the SMS 1 must be reconfigured.

FIG. 3 shows the network 100 to which a new device, which is computed tomography apparatus 10, has just been connected. The network 100 including the computed tomography apparatus 10 has the reference sign 100'. According to the state of the art, the operator must manually configure the SMS 1, so that it monitors the computed tomography apparatus 10 by opening a window 40 with the SMS 1 and viewing it on the screen of the SMS 1. Window 40 is shown in FIG. 4.

Window 40 has several fields 41 to 44. The operator must indicate the IP-address of the computed tomography apparatus 10 in field 43, the name of the computed tomography apparatus 10 in field 42, and the operating system of the computed controlled computed tomography apparatus 10 in field 44. Field 41 of window 40 is meant for labeling an icon which will be generated and displayed on the screen of the SMS 1 after the computed tomography apparatus 10 has been registered. In this case, this icon will be labeled "CT apparatus 10".

After the operator has appropriately filled out window 40, the SMS 1 is configured and an icon 30 representing the computed tomography apparatus 10 appears on the screen of the SMS 1 in addition to icons 22 to 29. This is illustrated in FIG. 5.

After configuring the SMS 1, the operator must configure the computed tomography apparatus 10 from the SMS 1 with its relevant event detection criterion or event detection criteria. The event detection criteria for a specific managed object can be defined using one or more appropriate templates. The template or templates may be stored on database 1a of the SMS 1. Once this template or templates are created, the relevant managed object, or more specifically its agent, will be configured with that template.

FIGS. 6 to 8 show an example of such a template 61. Template 61 defines an event detection criterion for monitoring the logfile of a managed object. Template 61 has a name-field 62 for defining template 61. In this case, the name of template 61 is "R0_HS_MST_VB22F_Syslog". Additionally, template 61 has a description-field 63, in which a short description of the event detection criteria may be written. Template 61 has also a field 64 which specifies the path and the name of the file to be monitored. The name of the logfile is "syslog". Furthermore, the time period in which the logfile "syslog" is automatically checked by the managed object for a new entry is defined by field 65 of template 61. In this example, the logfile "syslog" is checked each minute.

The actual event detection criteria of the managed object are defined utilizing a list 70, which is shown in FIG. 7. For this example, list 70 contains only one event detection criterion, which is: "Refused connect from denied node".

FIG. 8 shows a list 80 which is used to define the message of an event report sent from the managed object to the SMS 1 if an event defined by the event detection criterion occurs. The message can be written in message text field 81. For this example, the message of the event report is "Connection refused from <*.node>", when there is an unauthorized attempt to log on the managed object. "<*.node>" is actually a wildcard, which is replaced by the actual system's name from which the unauthorized log on was attempted.

Apparently, the operator of the SMS 1 must perform relatively many time consuming manual steps to configure the SMS 1 and the computed tomography apparatus 10.

SUMMARY OF THE INVENTION

It is an object of the present invention to provide a method that enables easy configuration of a computer which monitors a network after a new managed object has been connected to the network. It is another object of the present invention to provide a method that enables easy reconfiguration of a computer which monitors a managed object after at least one significant parameter of the managed object has been changed.

A more limited object of the present invention is to additionally provide a method that enables easy configuration of a managed object which has recently been added to a network. Another more restricted object of the present invention is to additionally provide a method for easy reconfiguring of a managed object whose significant parameters have been modified.

This object is achieved in accordance with the present invention in a method for automatically configuring a first computer which monitors a first network having a first plurality of managed objects, having the steps of: connecting a second computer to the first network; writing a first message containing a first information about the IP-address (Internet Protocol address) and the operating system of the second computer, and at least one application run on the second computer; sending the first message with the second computer to the first computer; automatically retrieving the first information from the first message with the first computer; and based on the first information, automatically configuring the first computer, so that it monitors the second computer in addition to the first plurality of managed objects.

The first computer monitors the first network, which is made up of the first plurality of managed objects. The second computer which has just been connected to the first network is be monitored by the first computer in addition to the first plurality of managed objects; the second computer therefore becomes a managed object. According to the invention, the first message is sent to the first computer. The first message contains information necessary to automatically configure the first computer, so that it is able to monitor the second computer. Inventively, the first computer retrieves this information from the first message and automatically configures itself. Thus the only manual steps to be performed for configuring the first computer are writing the first message and sending the first message to the first computer. The actual configuration of the first computer is carried out automatically, resulting in a savings of time compared to the configuration according to the state of the art.

After the first computer is configured, the second computer has to be configured to perform event detection. Preferably, the inventive method may comprise, after the step of automatically configuring the first computer, the steps of: automatically retrieving, based on the first information about the operating system and the application, at least one relevant event detection criterion which is stored on a database of the first computer; automatically generating a second message containing a second information about the event detection criterion; automatically sending the second message to the second computer; automatically retrieving the second information about the event detection criterion with the second computer; and based on the event detection criterion, automatically configuring the second computer, so that it will detect events according to the event detection criterion.

Thus the first computer automatically performs all necessary steps to configure the second computer, after its self-configuration. The relevant event detection criteria are stored on the database of the first computer. For instance, if the second computer belongs to a type of managed object which is already monitored by the first computer, then the first computer must only retrieve the event detection criterion related to that type of managed object from its database, and send the second message containing information about the retrieved event detection criterion to the second computer. Consequently, contrary to the state of the art, the time consuming steps required to configure the first and the second computers are carried out automatically when a new computer has been added to the first network. Therefore the only manual action to be performed is the writing of the first message and the sending of it to the first computer after the second computer has been connected to the first network. All following steps to configure the first and the second computers are carried out automatically. Further manually performed steps are unnecessary, resulting in a fast and reliable configuration of both computers.

The inventive method can easily be implemented if the first plurality of managed objects and the second computer are monitored with an agent-manager Network Management System. Then, as realized according to a preferred embodiment of the invention, the structure of an event report used by the agent-manager Network Management System for sending the first message is utilized. An advantage of this variant of the invention is that the first computer, which is then a System Management Station (SMS), can easily receive and process the first message. A costly or time-consuming modification of the hardware or software of the first computer (SMS) is therefore unnecessary.

Should the first network be monitored by a hierarchical structured computer system, i.e. should the first network be monitored by the first computer which communicates with another computer which also monitors the first network, then the inventive method may comprise, after the step of automatically configuring the first computer, the steps of: automatically forwarding the first message from the first computer to a third computer which monitors the first plurality of managed objects; automatically retrieving the first information from the first message with the third computer; and based on the first information, automatically configuring the third computer, so that it monitors the second computer in addition to the first plurality of managed objects.

For practical purposes different operators may control different networks with the same computer. Then each operator only wants to receive information about the managed objects of the network for which he/she is responsible. As a result, the inventive method may be carried out in such a way that the first computer is configured to monitor a second network which is comprised of a second plurality of managed objects, the first computer is configured so that an operator can choose if he/she wants to monitor only the first network or the second network, and the first information of the first message comprises additionally information about the location of the second computer, so that the first computer will be able to assign the second computer to the first network. Consequently, the first computer is configured to monitor the second computer when the operator chooses the first network and does not monitor the second computer, and when the operator chooses the second network.

The above object is also achieved in accordance with the invention by means of a method comprising the steps of: receiving, at a first computer which monitors a first plurality of managed objects comprising a first network, a first information about the IP-address, the operating system, and at least one application of a managed object which has just been added to the first network; and based on the first information, automatically configuring the first computer so that it monitors the managed object in addition to the first plurality of managed objects based on the first information.

The inventive method may additionally comprise the steps of: automatically retrieving, based on the operating system and the application to be run on the managed object, at least one relevant event detection criterion which is stored on a database of the first computer; automatically conveying the event detection criterion to the managed object; and automatically configuring the managed object with the event detection criterion, so that it detects events according to the event detection criterion.

The second object is achieved in accordance with the invention by means of a method comprising the steps of: receiving, at a first computer which monitors a managed object from said managed object, a first information about at least one changed parameter of the managed object selected from the group consisting of the IP-address, the operating system, and an application of the managed object; and based on the first information, automatically configuring the first computer, so that it monitors the managed object according to the changed parameter. According to the state of the art, the computer monitoring a network must be manually reconfigured if at least one significant parameter of a managed object has been changed. The significant parameter is, for instance, the IP-address of the managed object, if the managed object is, for example, relocated. The significant parameter may also be a modification of an application run on the managed object or the addition of an application. An application may be software run on the computer, hardware of the computer, or software or hardware of the device controlled by the computer. In contrast to the state of the art by which steps to configure the first computer are cumbersome and carried out manually, the invention provides a method to carry out these steps automatically.

According to a preferred variant of the invention, the method may additionally comprise the steps of: automatically retrieving, based on the first information, at least one event detection criterion which is stored on a database of the first computer and is relevant for the changed parameter; automatically conveying the event detection criterion to the managed object; and automatically configuring the managed object with the event detection criterion, so that it detects events according to the event detection criterion. As a result, the only manual action to be carried out is the writing of the first message and the sending of it to the first computer after the significant parameter of the managed object has been changed. All following steps, including the reconfiguration of the first computer and the managed object due to the changed parameter are carried out automatically. Further manually performed steps are unnecessary, resulting in a fast and reliable configuration of the first computer and the managed object.

DESCRIPTION OF THE PREFERRED EMBODIMENTS

The invention is described with reference to FIGS. 1 to 11. Contrary to the state of the art, the operator does not need to carry out manual steps to reconfigure the SMS 1 and to configure the computed tomography apparatus 10, as has been described in the introduction. The steps according to the invention are also illustrated by FIG. 9.

Figure 10:
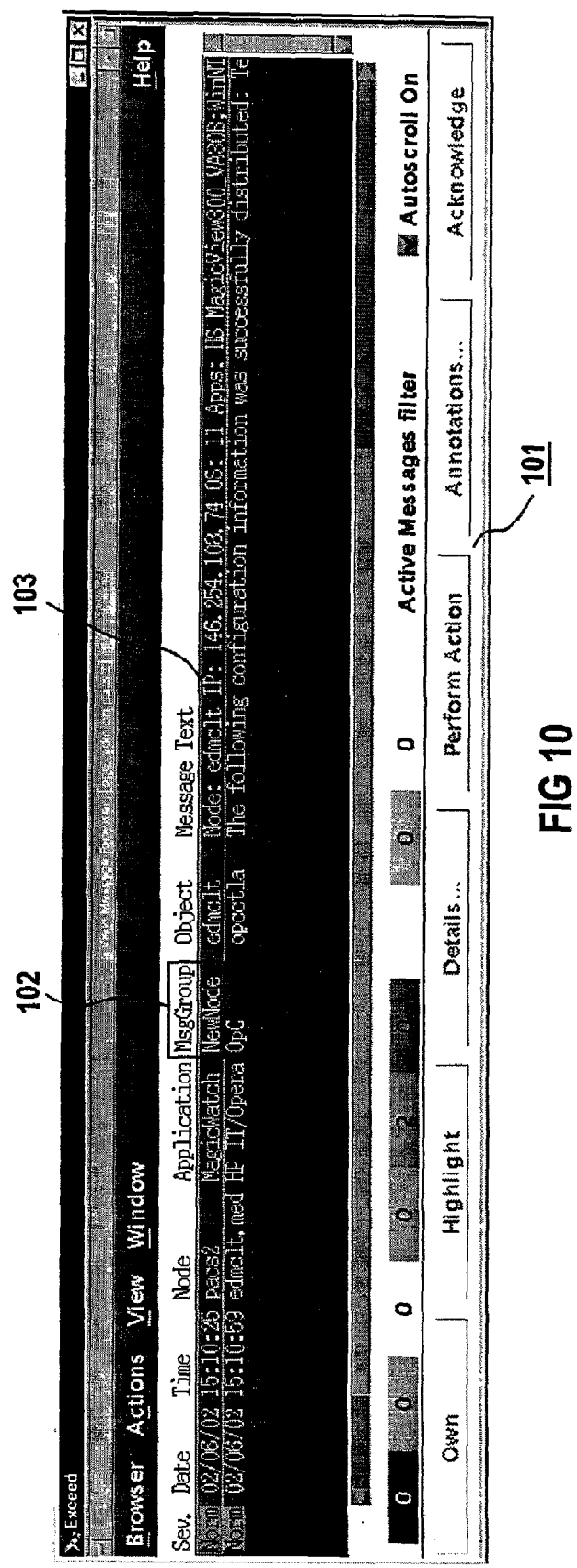
FIG. 10 is an event report.
Figure 11:
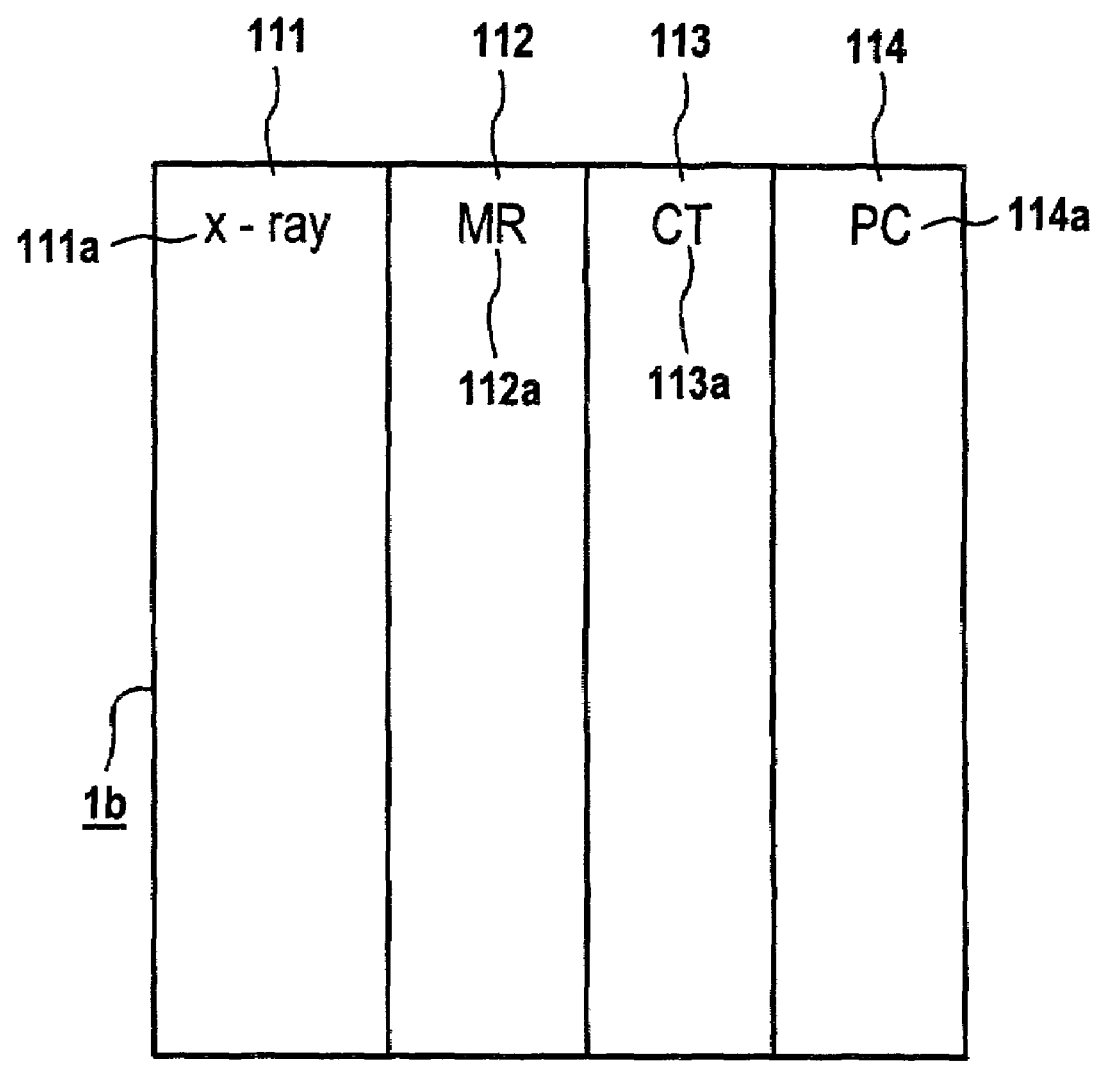
FIG. 11 is a structure of a database.

After the technician has installed and connected the computed tomography apparatus 10 to the network 100, he generates a message using the computed tomography apparatus 10 The technician generates the message using a form 101 which is shown in FIG. 10. Form 101 has the structure of an event report usually generated by an agent of one of the managed objects 2 to 9 for the purpose of informing the SMS 1 about an event which has occurred at the relevant managed object. If the event report is generated by one of the managed objects 2 to 9, then the message text of the event report comprises an information about the event. For instance, if the event were an attempted unauthorized log on to that managed object, then the message would be "Refused connect from denied node".

Since the technician generates the form 101 to inform the SMS 1 about the recently installed computed tomography apparatus 10, he indicates the IP-address, the name, and the operating system of the computed tomography apparatus 10 as the message text 103 of form 101. The technician marks also a field 102 which is titled "MsgGroup" (Message Group) with "NewNode". After that, he sends the filled out form 101 for the computed tomography apparatus 10 over the network 100' to the SMS 1.

Figure 9:
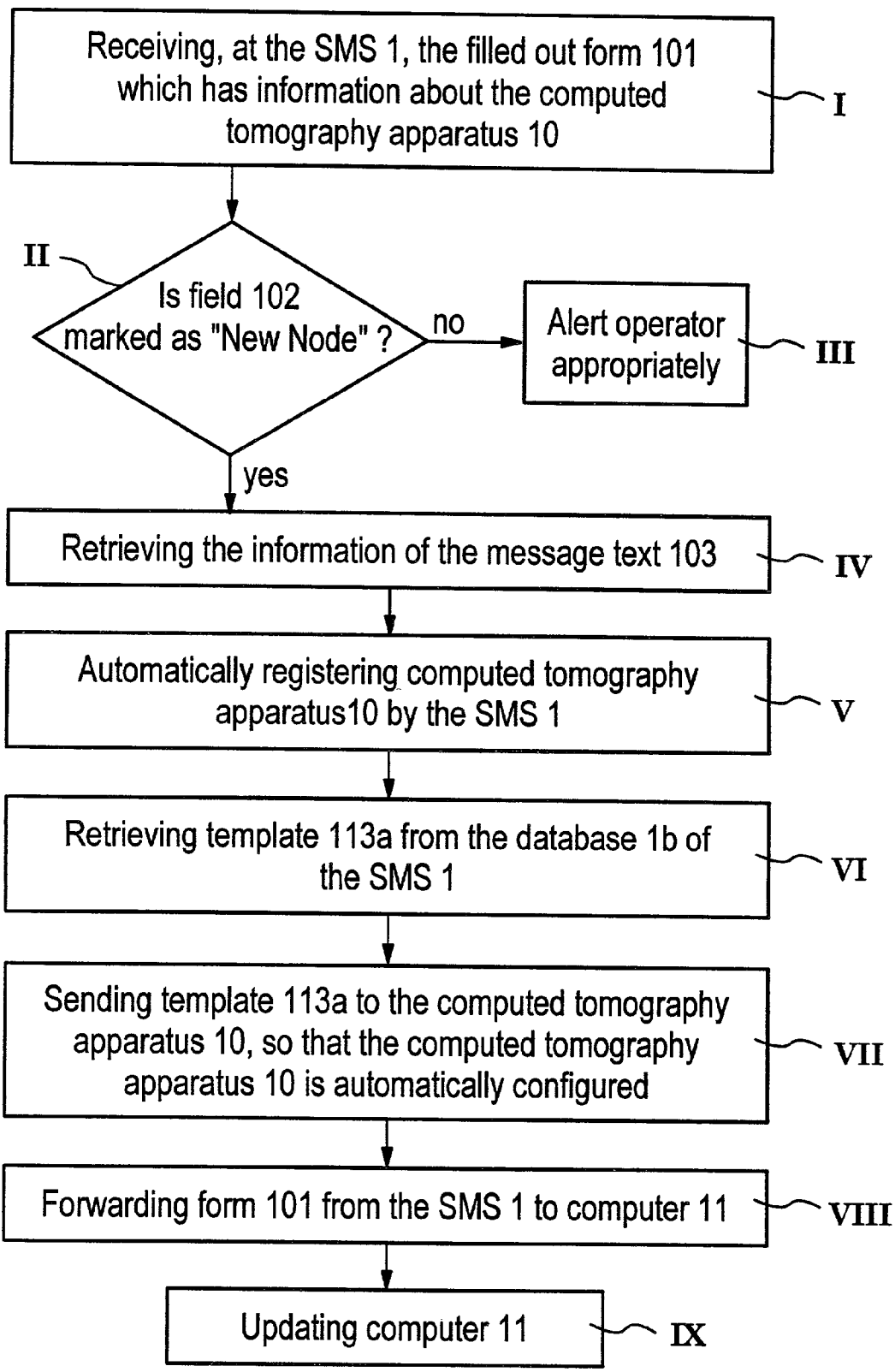
FIG. 9 is a flow chart illustrating the invention.

The SMS 1 receives the filled out form 101 with its Message Stream Interface (MSI) 1b (step I of the flow chart of FIG. 9). The MSI 1b is configured to differentiate event reports into two categories: event reports sent by agents of the managed objects 2 to 9 of the network 100 (or network 100', if the computed tomography apparatus 10 has already been connected to the network 100), and event reports which may be potential managed objects. The MSI 1b differentiates these by checking the message of the field 102 of each received event report (step II of the flow chart of FIG. 9)

The field 101 of event reports sent by managed objects 2 to 9 are not marked with "NewNode" and are processed by the SMS 1 to alert the operator (step III of the flow chart of FIG. 9) appropriately.

Since the field 102 of the form 101 which has been sent by the technician is marked with "NewNode", the SMS 1 recognizes the related event report as being a message that a new device has been connected to the network 100, and that this device shall be automatically registered. Thus the SMS 1 retrieves the information from the message Text 103 of form 101, i.e. the SMS 1 retrieves the information about the IP-address, the name, and the operating system of the computed tomography apparatus 10 (step IV of the flow chart of FIG. 9).

Figure 1:
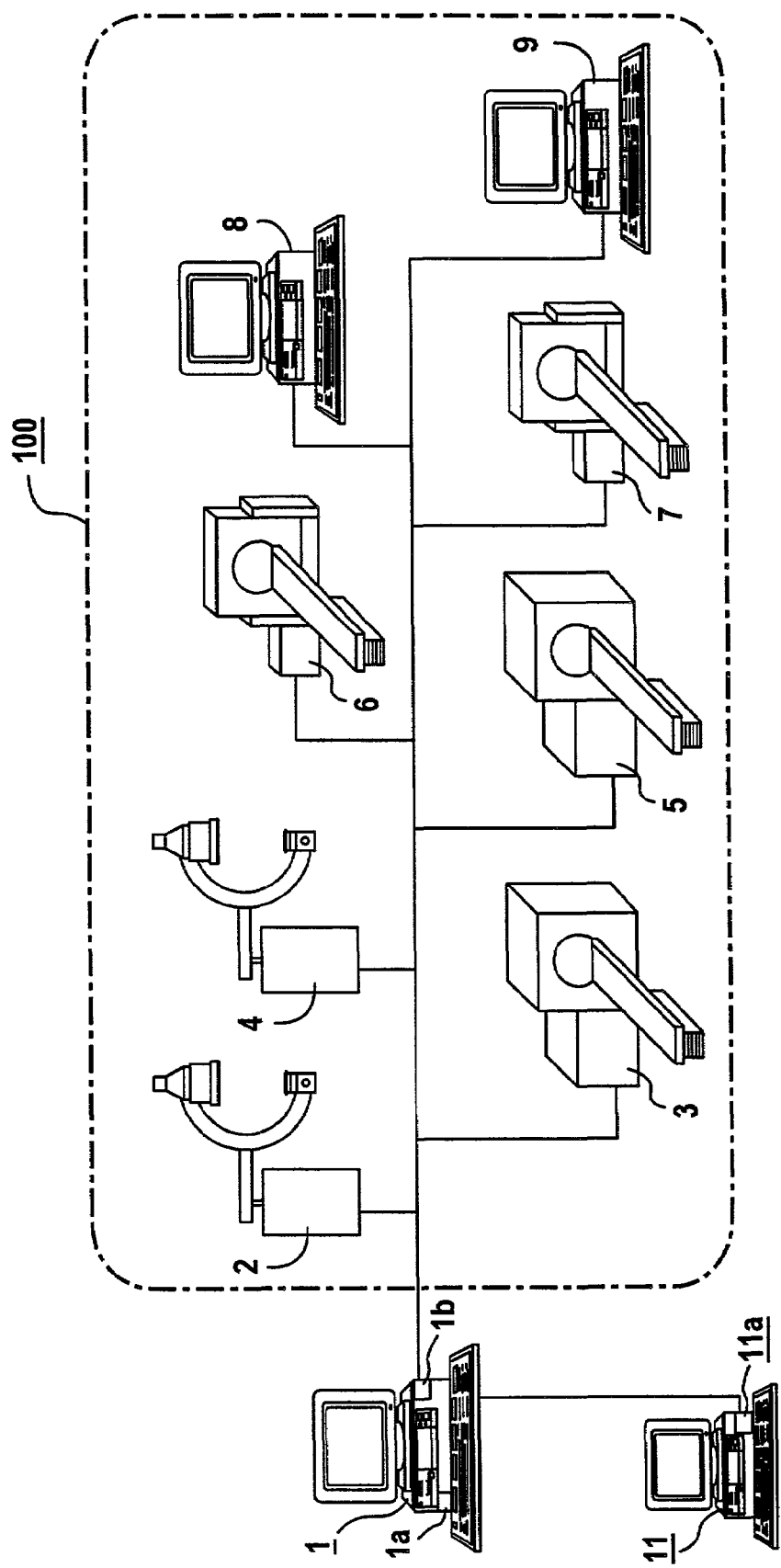
FIG. 1 is a pictoral diagram of a network.
Figure 2:
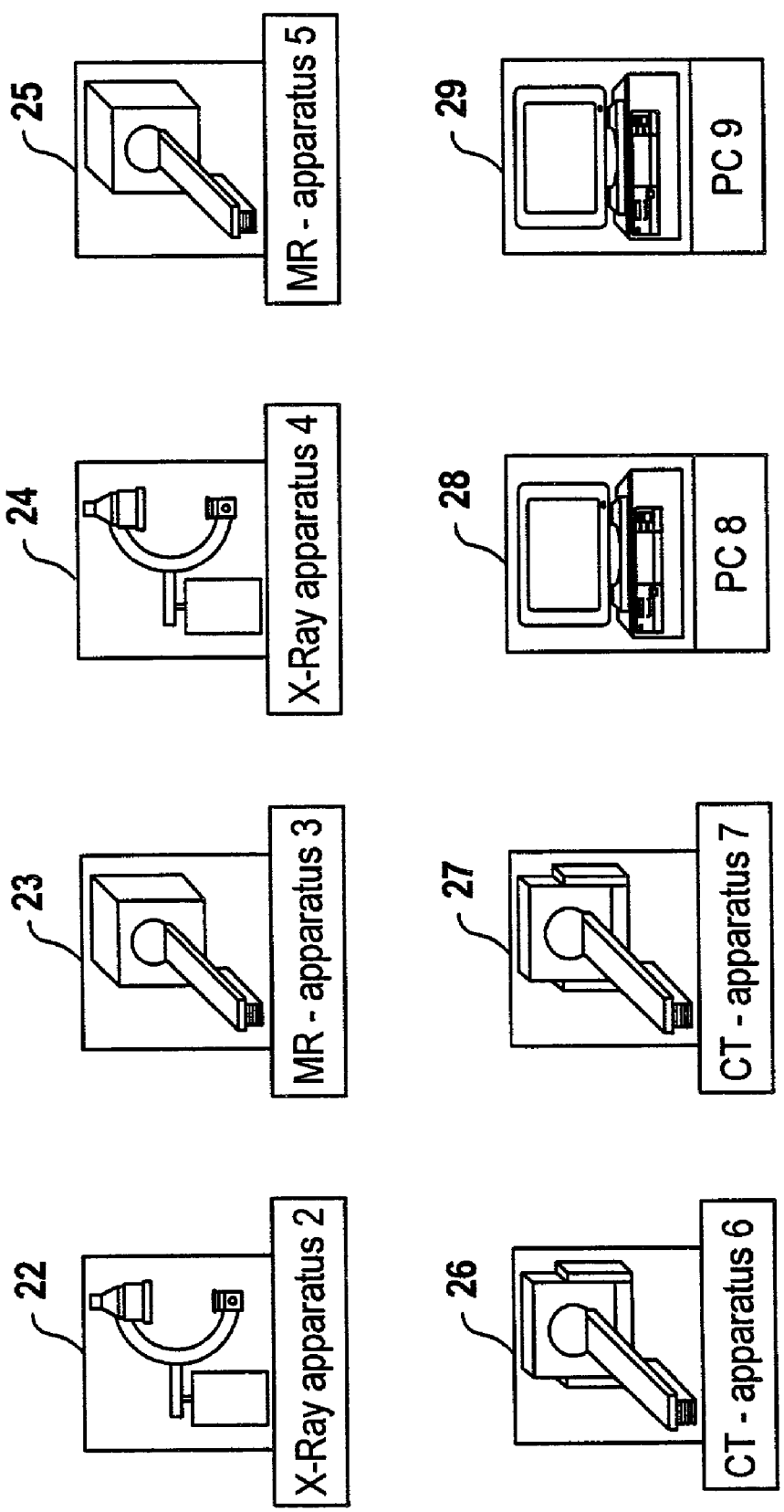
FIG. 2 is a pictoral diagram showing a computer display of the network depicted in FIG. 1.
Figure 3:
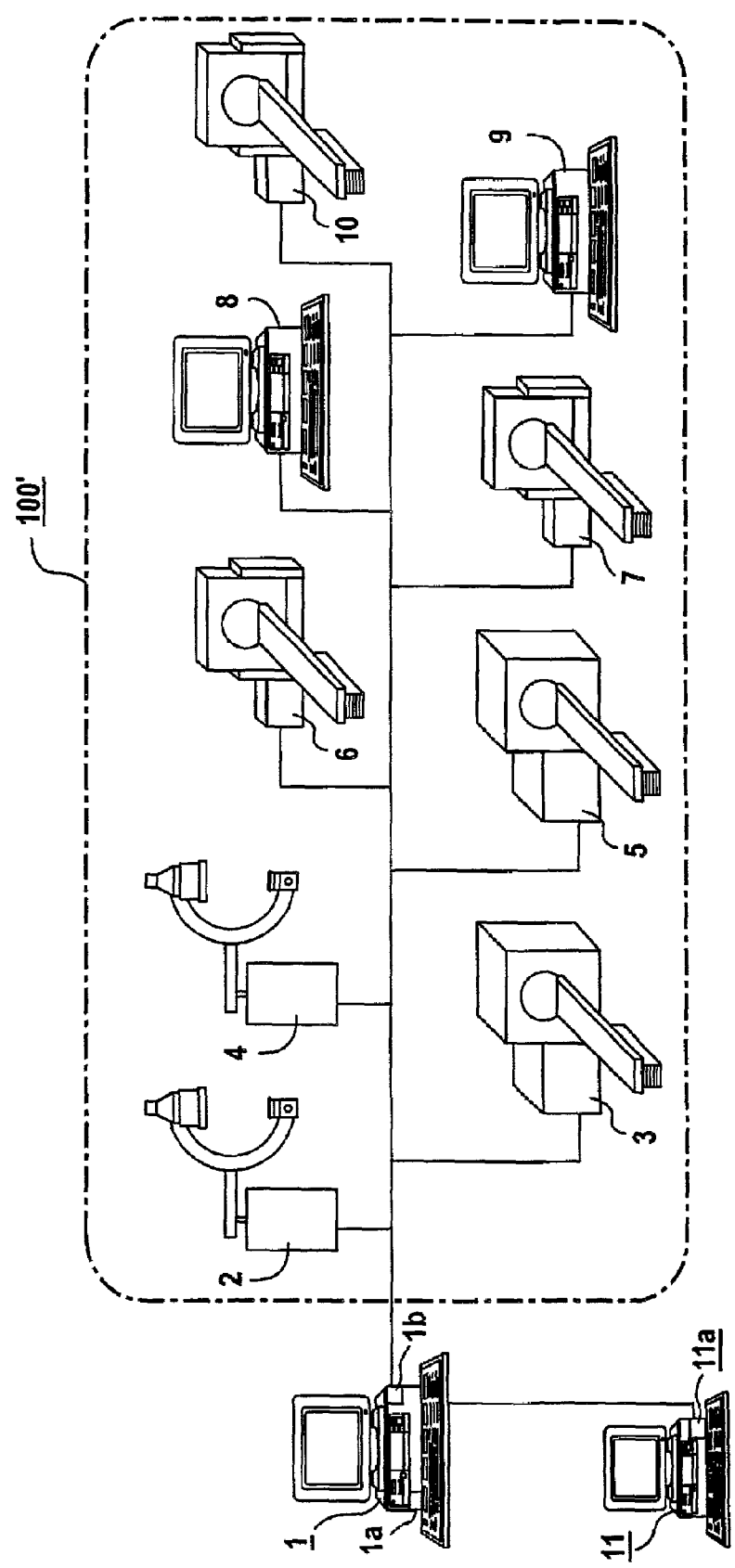
FIG. 3 is a pictoral diagram of a network.
Figure 4:
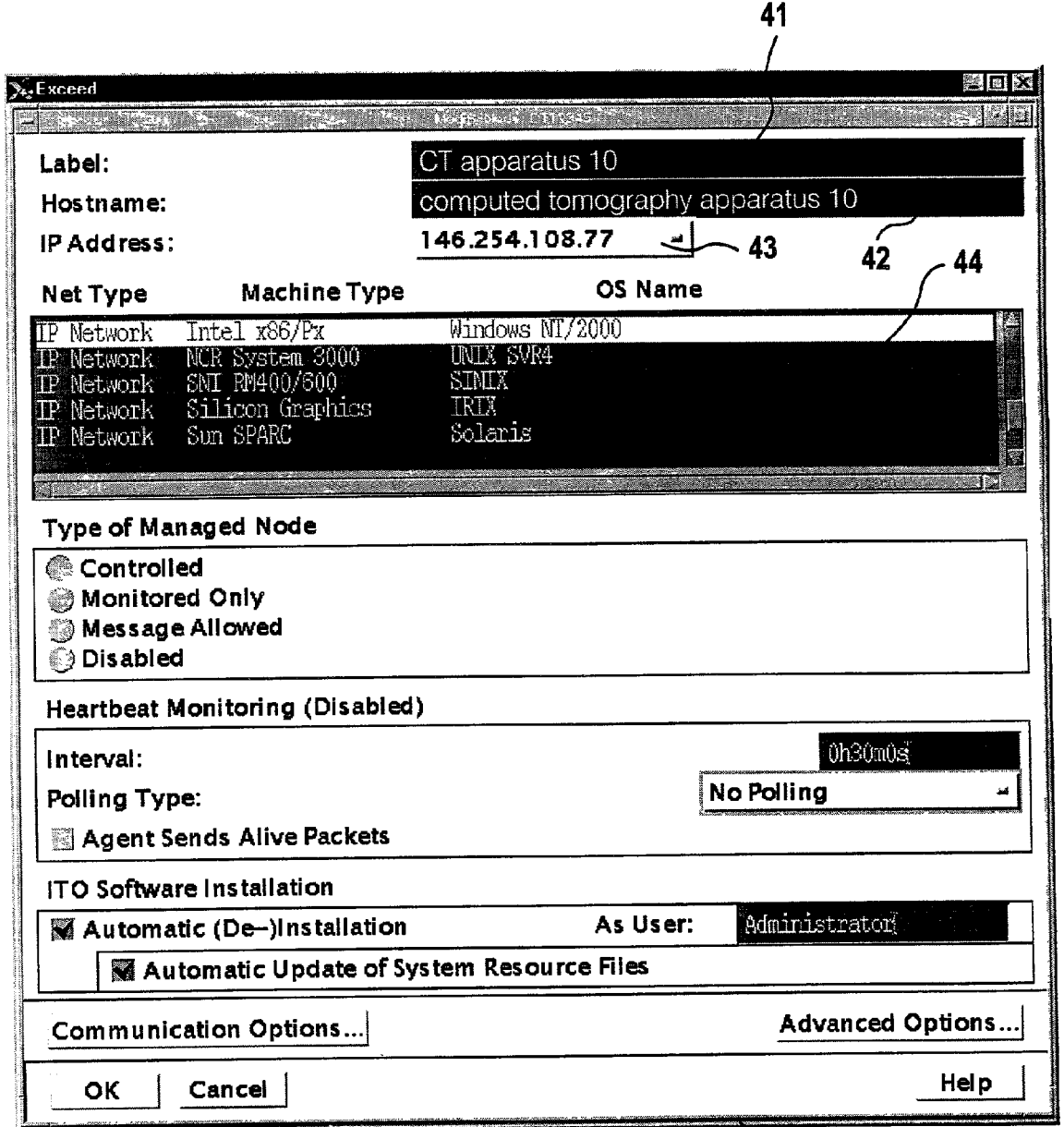
FIG. 4 is a mask for manually registering a new managed object.
Figure 5:
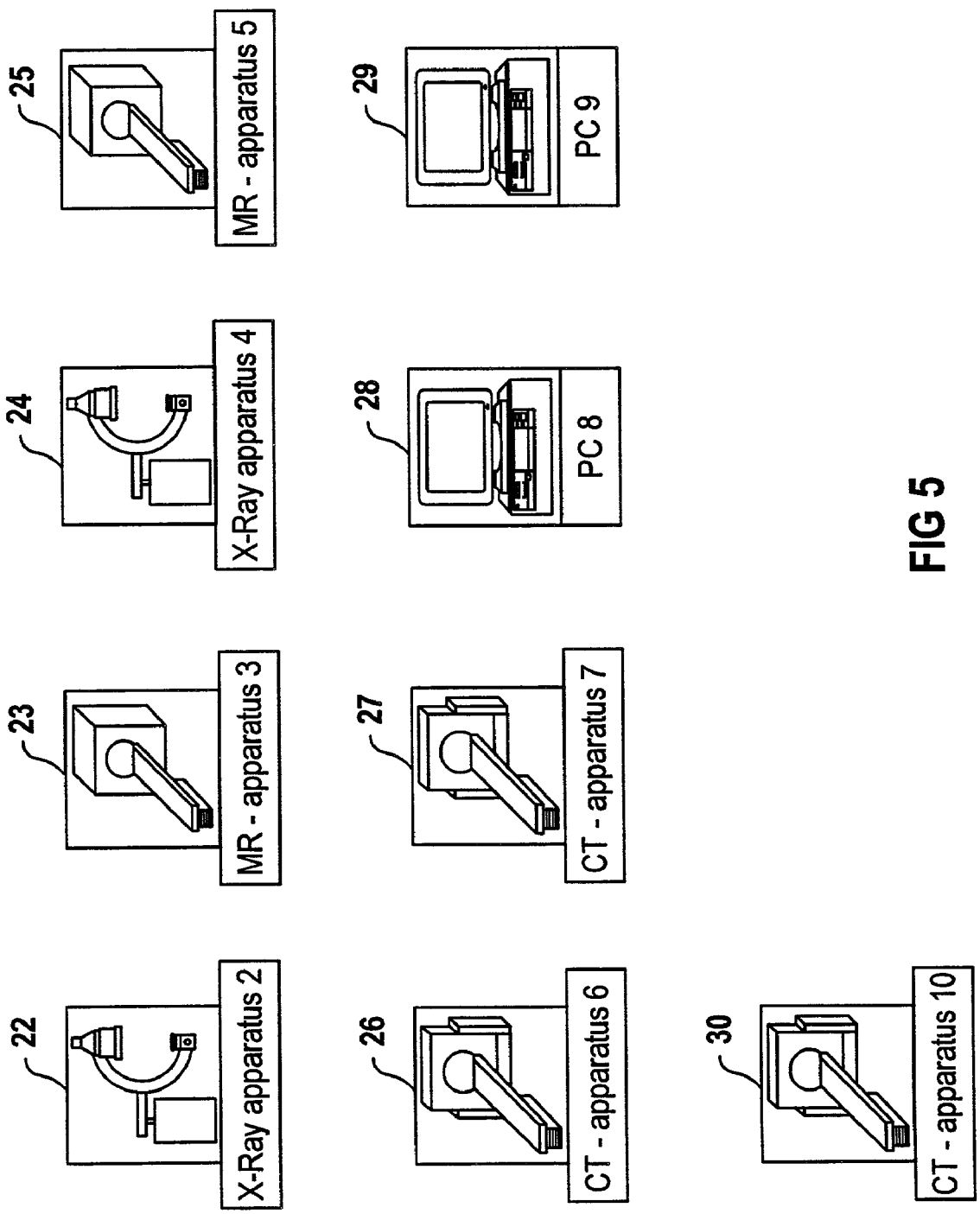
FIG. 5 is a pictoral diagram showing a computer display of the network depicted in FIG. 3.
Figure 6:
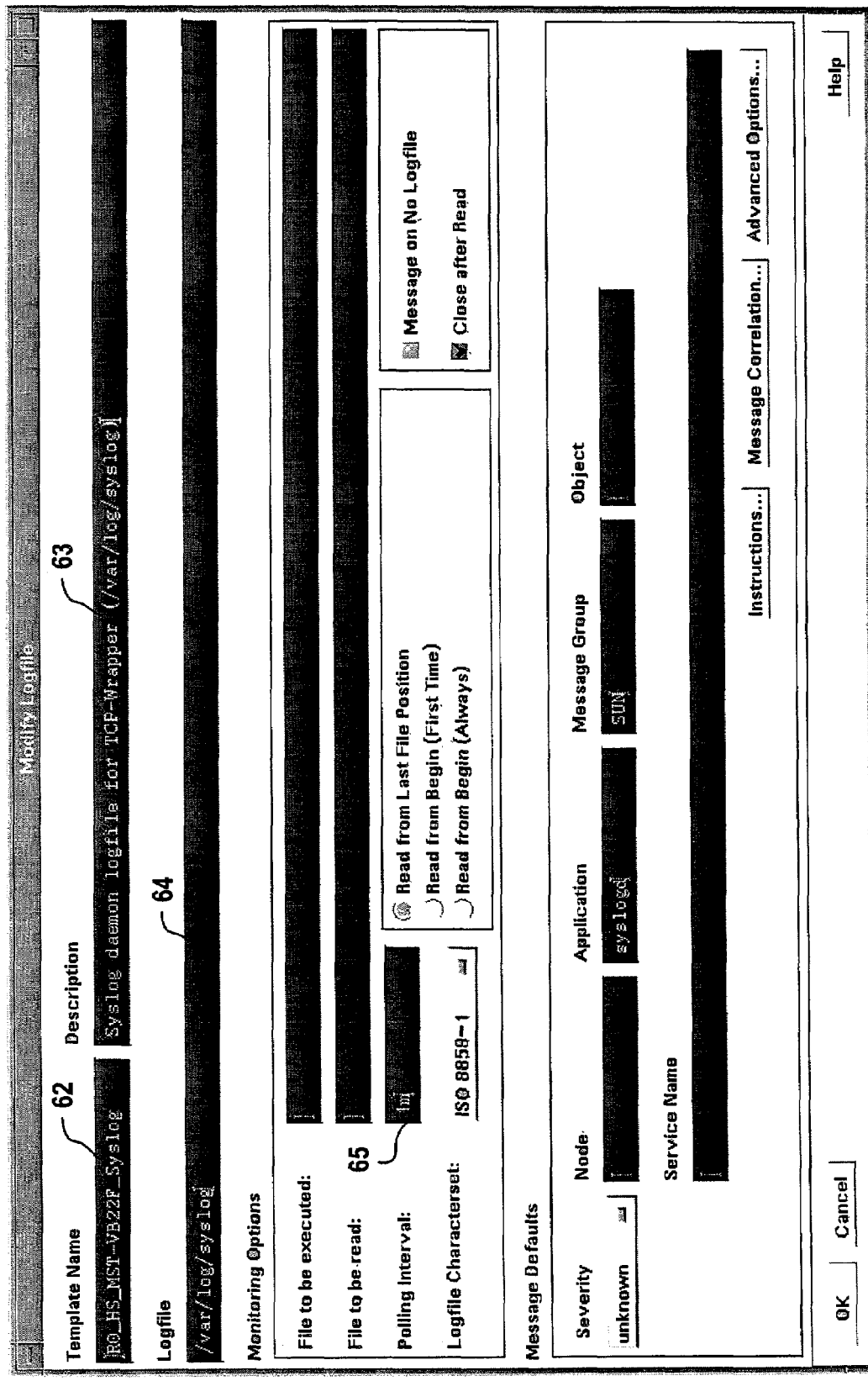
FIG. 6 is a template for defining an event detection criterion.
Figure 7:
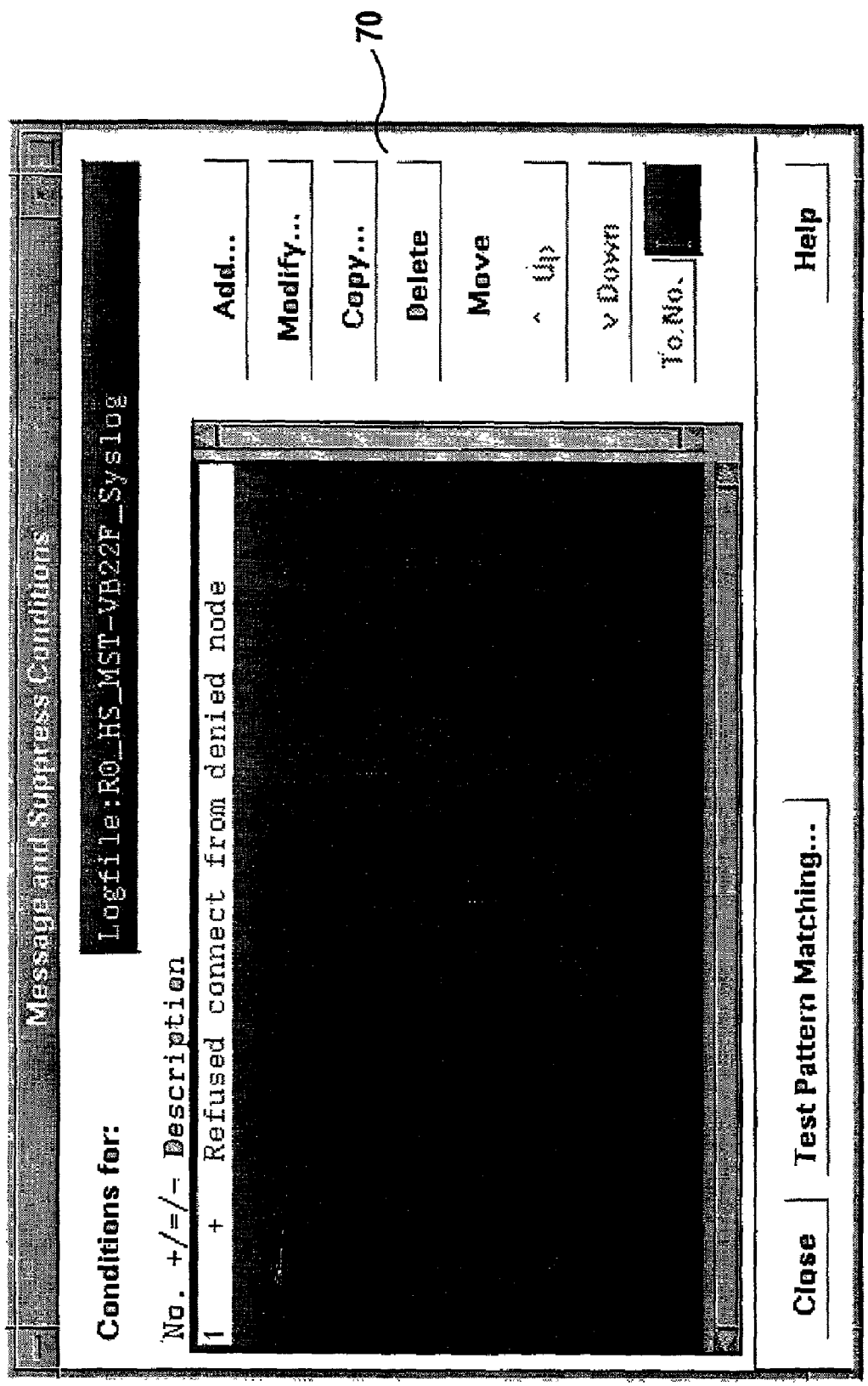
FIG. 7 is the list associated with the template of FIG. 1 for defining the actual event detection criterion.
Figure 8:
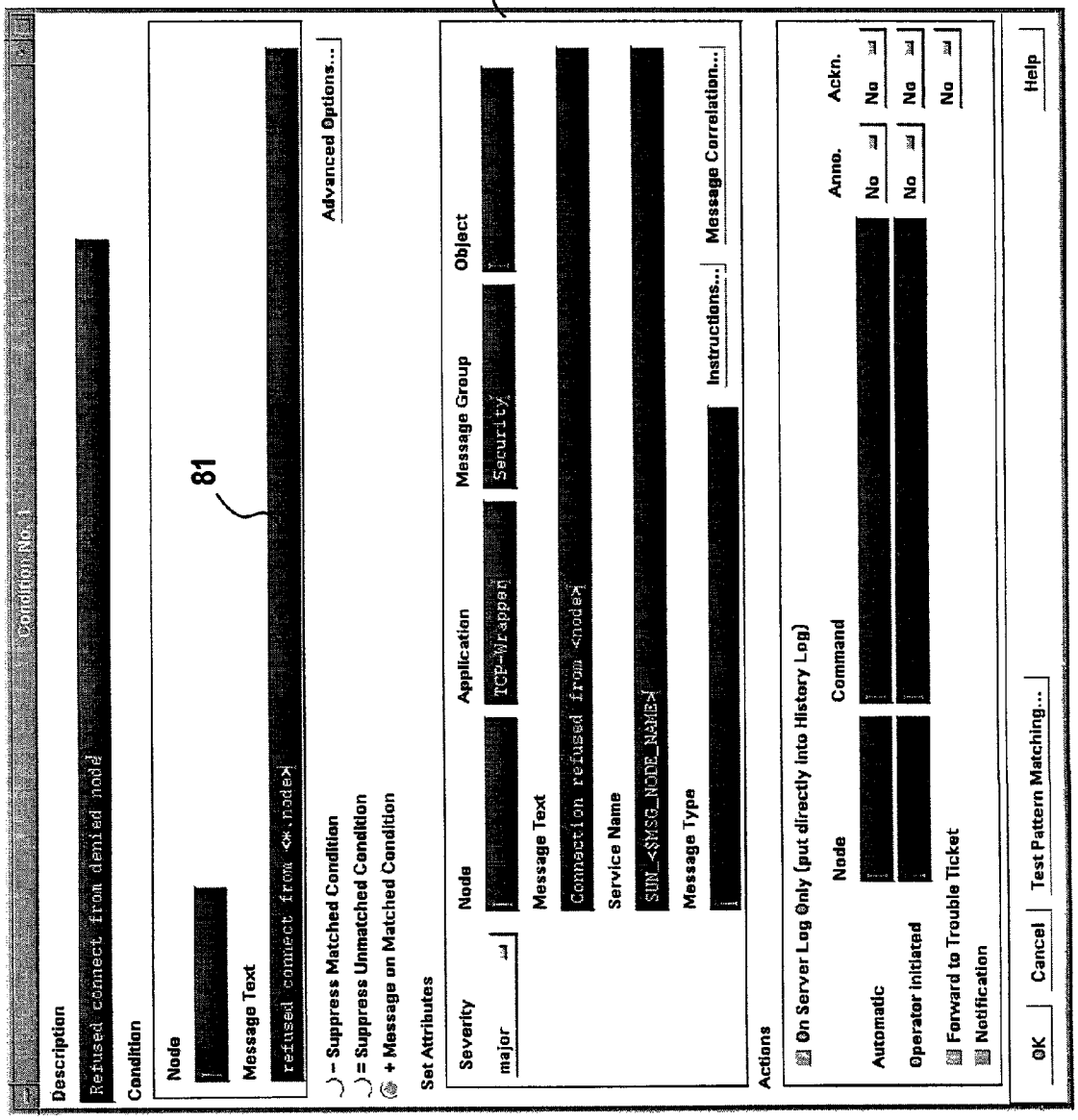
FIG. 8 is a list for defining a message of an event report.

Based on the retrieved information, the SMS 1 automatically generates the icon 30 from a list of generic icons and displays it with the icons 22 to 29 representing the managed objects 2 to 9 on the display of the SMS 1 (see FIG. 5). The icon 30 represents the computed tomography apparatus 10 and is titled "CT apparatus 10". The list of generic icons is stored on a database associated with the manager of the SMS 1. Additionally, the SMS 1 updates the manager's database, so that the computed tomography apparatus 10 is included in the list of managed objects 2 to 9. Consequently, the SMS 1 automatically registers the computed tomography apparatus 10 and is thus able to monitor it in addition to the managed objects 2 to 9 (step V of the flow chart of FIG. 9).

After the SMS 1 is automatically reconfigured to monitor the computed tomography apparatus 10, and particularly to recognize an eventual event report sent by the computed tomography apparatus 10, the computed tomography apparatus 10 must then be configured to know its event detection criterion or event detection criteria.

For this example, the SMS 1 has a database 1b which contains four tables 111 to 114 on which templates 111a to 114a, corresponding to each of the types of managed objects which are monitored by the SMS 1, are stored. Each of the templates contain one or more event detection criteria relevant for the corresponding type of managed object. The event detection criteria may be related to the operating system and to at least one application of the corresponding type of managed object. A specific application run on the computed tomography apparatuses 6, 7, and 10 may be associated with their gantrys x-ray systems or x-ray detection systems. The database is depicted in more detail in FIG. 11. Table 111 corresponds to the managed objects of the type "x-ray apparatus"; table 112 corresponds to managed objects of the type "MR-apparatus", table 113 corresponds to managed objects of the type "CT-apparatus", and table 114 corresponds to managed objects of the type "PC". Templates 111a to 114a are comparable to template 61 of FIG. 6.

Since the SMS 1 received information about the name of the computed tomography apparatus 10, it has been informed that this is a computed tomography apparatus and thus has information about relevant applications run on the computed tomography apparatus 10. Thus, the SMS 1 automatically retrieves template 113a, which has event detection criteria for computed tomography apparatuses, and sends it to the IP-address of the computed tomography apparatus 10, which will automatically be configured to detect events according to the event detection criteria of template 113a (steps VI and VII of the flow chart of FIG. 9).

For the exemplary embodiment, network 100 (or network 100', if the computed tomography apparatus 10 has been connected to the network 100) is not only monitored by the SMS 1, but also by a second computer 11 which communicates with the SMS 1. Therefore, computer 11 must also be updated to be able to monitor the computed tomography apparatus 10. Thus, the SMS 1 forwards form 101 to computer 11. Computer 11 receives form 101 with its Message Stream Interface (MSI) 11a. As the MSI 1b of the SMS 1, the MSI 11a of computer 11 is configured to differentiate between event reports sent by agents of registered managed objects and event reports which may be potential managed objects by checking the field 101 of each received event report (step VIII of the flow chart of FIG. 9).

After receiving form 101 computer 11 performs essentially the same steps to include the computed tomography apparatus 10 in its list of managed objects, as the SMS 1 performed upon receiving form 101 (step IX of the flow chart of FIG. 9).

After a while, the technician relocates for the present exemplary embodiment the computed tomography apparatus 10 and assigns it a new IP-address. As a result, a significant parameter of the computed tomography apparatus 10 has been modified. Other significant parameters may be its name, its operating system, and any one of its applications. Since a significant parameter has been changed, the SMS 1 and the computed tomography apparatus 10 must be reconfigured. The technician therefore generates a message using a form comparable to form 101 of FIG. 10 and sends it from the computed tomography apparatus 10 via the network 100' to the SMS 1. The message comprises information about the modified IP-address of the computed tomography apparatus 10. The SMS 1 receives this message, retrieves the information about the new IP-address, and automatically reconfigures itself as described before. After the SMS 1 is reconfigured, it retrieves the relevant template from its database 1b and conveys it to the computed tomography apparatus 10, so that it can reconfigure itself with that template. After that, the SMS 1 forwards the message received from the computed tomography apparatus 10 to computer 11, so that computer 11 can be automatically reconfigured.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for automatically configuring a first computer which monitors a network having a plurality of managed objects, comprising the steps of:
    connecting a second computer to said network;
    via a user-interface at said second computer, writing a first message containing first information about an IP-address, and an operating system of said second computer, and at least one application run on said second computer;
    sending said first message from said second computer to said first computer;
    automatically retrieving said first information from said first message with said first computer;
    based on said first information, automatically configuring said first computer, to monitor said second computer in addition to said first plurality of managed objects;
    automatically retrieving, based on said first information about said operating system and said application, at least one relevant event detection criterion which is stored on a database of said first computer;
    automatically generating a second message containing a second information about said event detection criterion;
    automatically sending said second message to said second computer;
    automatically retrieving said second information about said event detection criterion with said second computer; and
    based on said event detection criterion, automatically configuring said second computer, to detect events according to said event detection criterion.

2. The method of claim 1, comprising the monitoring of said first plurality of managed objects and said second computer with an agent-manager Network Management System.

3. The method of claim 2, utilizing the structure of an event report used by said agent-manager Network Management System for sending said first message.

4. The method of claim 1, comprising, after the step of automatically configuring said first computer, the steps of:
    automatically forwarding said first message from said first computer to a third computer which monitors said first plurality of managed objects;
    automatically retrieving said first information from said first message with said third computer; and
    based on said first information, automatically configuring said third computer, to monitor said second computer in addition to said first plurality of managed objects.

5. The method of claim 1, wherein said network is a first network and wherein said plurality of managed objects is a first plurality of managed objects, and wherein said first computer is configured to monitor a second network, comprised of a second plurality of managed objects; said first computer being configured to allow an operator to select whether to monitor only said first network or said second network, and said first information from said first message comprises additionally information about the location of said second computer, so that said first computer is able to assign said second computer to said first network.

6. The method of claim 1, wherein said second computer controls a medical device and said application is related to said medical device.

7. A method, comprising the steps of:
    receiving, at a first computer which monitors a first plurality of managed objects comprising a first network, information about an IP-address, an operating system, and at least one application of a managed object which has just been added to said first network;
    based on said information, automatically configuring said first computer, to monitor said managed object in addition to said first plurality of managed objects based on said information; and
    configuring said first computer to monitor a second plurality of managed objects comprising a second network, and to allow an operator to select whether to monitor only said first plurality of managed objects or said second plurality of managed objects, and including in said information additional information about the location of said managed object, to allow said first computer to assign said managed object to said first plurality of managed objects, thereby providing a configured computer.

8. The method of claim 7, comprising, after the step of automatically configuring said first computer, the steps of:
    automatically retrieving, based on said operating system and said application to be run on said managed object, at least one relevant event detection criterion which is stored on a database of said first computer;
    automatically conveying said event detection criterion to said managed object; and
    automatically configuring said managed object with said event detection criterion, to detect events according to said event detection criterion.

9. The method of claim 7, comprising employing said managed object to generate a message which contains said information and conveying said message from said managed object to said first computer.

10. The method of claim 7, comprising monitoring said first plurality of managed objects and said managed object with an agent-manager Network Management System.

11. The method of claim 10, comprising utilizing a message having the structure of an event report used by said agent-manager Network Management System for receiving said information.

12. The method of claim 7, comprising, after the step of automatically configuring said first computer, the steps of:
    automatically forwarding said information from said first computer to a second computer; and
    based on said information, automatically configuring said second computer, to monitor said managed object in addition to said first plurality of managed objects.

13. The method of claim 7, wherein said managed object is a computer controlled medical device.

14. A method, comprising the steps of:
    at a first computer which monitors a managed object, receiving from said managed object information about at least one changed parameter of said managed object selected from the group consisting of a name, an IP-address, an operating system, and an application of said managed object;
    based on said information, automatically configuring said first computer to monitors said managed object according to said changed parameter; and
    after automatically configuring said first computer, automatically forwarding said first information from said first computer to a second computer, and based on said first information, automatically configuring said second computer, to monitor said managed object according to said information, thereby providing a configured computer.

15. The method of claim 14, comprising, after the step of automatically configuring said first computer, the steps of:
    automatically retrieving, based on said information, at least one event detection criterion which is stored on a database of said first computer and is relevant for said changed parameter;
    automatically conveying said event detection criterion to said managed object; and
    automatically configuring said managed object with said event detection criterion to detect events according to said event detection criterion.

16. The method of claim 14, comprising monitoring said managed object with an agent-manager Network Management System.

17. The method of claim 16, utilizing a message having the structure of an event report used by said agent-manager Network Management System for receiving said first information.

18. The method of claim 14, wherein said managed object is a computer controlled medical device.

* * * * *